United States Patent
Lester et al.

(10) Patent No.: US 6,264,757 B1
(45) Date of Patent: *Jul. 24, 2001

(54) SEPARATING CONTAMINANTS FROM CONTINUOUS FROM SURFACE CLEANSING SOLUTION DURING CONTINUOUS STRIP STEEL PROCESSING

(75) Inventors: Brian K. Lester, Weirton; Kenneth R. Olashuk, Follansbee, both of WV (US)

(73) Assignee: Wierton Steel Corporation, Wierton, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/121,109

(22) Filed: Jul. 23, 1998

Related U.S. Application Data (63) Continuation-in-part of application No. 08/794,783, filed on Feb. 3, 1997, now Pat. No. 5,830,282, which is a continuation-in-part of application No. 08/445,530, filed on May 23, 1995, now Pat. No. 5,599,395.

(51) Int. Cl.[7] ........................................ B08B 1/02
(52) U.S. Cl. ..................... 134/15; 134/10; 134/64 R; 134/109; 118/67; 118/68; 118/405; 118/419; 118/610; 118/623
(58) Field of Search .................. 134/2, 15, 10, 134/64 R, 109; 118/58, 67, 68, 405, 419, 610, 623, 683

(56) References Cited

U.S. PATENT DOCUMENTS

| | | | | |
|---|---|---|---|---|
| 3,617,039 | * | 11/1971 | Fukui et al. ............................ | 134/15 |
| 5,062,438 | * | 11/1991 | Micheletti ................................ | 134/9 |
| 5,127,958 | * | 7/1992 | Personette ................................ | 134/2 |
| 5,348,628 | * | 9/1994 | Ishibashi et al. ........................ | 134/10 |
| 5,830,282 | * | 11/1998 | Olashuk ................................... | 134/10 |
| 5,879,465 | * | 3/1999 | McKevitt et al. ......................... | 134/3 |

* cited by examiner

*Primary Examiner*—Frankie L. Stinson
*Assistant Examiner*—Saeed Chaudhry
(74) *Attorney, Agent, or Firm*—Shanley and Baker (57) ABSTRACT

Cold-reduced flat-rolled low carbon steel strip is surface cleansed of iron fines, iron oxide particulate and associated debris which result from cold-reduction operations. Such ferromagnetic contaminants are permanently separated from the strip steel production and finishing system by continuous regenerative processing of alkali cleansing solution, in which contaminants are continuously filtered and concentrated and are flushed from a continuous-flow filtering apparatus for magnetically-assisted separation of such contaminants which are retained for complete and permanent disposal from the system, providing uniform cleansing solution, on a continuing basis, free of large-volume periodic dumping of contaminated solution, and free of interruption of operations for surface cleansing purposes.

13 Claims, 3 Drawing Sheets

SEPARATING CONTAMINANTS FROM CONTINUOUS FROM SURFACE CLEANSING SOLUTION DURING CONTINUOUS STRIP STEEL PROCESSING

RELATED APPLICATIONS

This application is a continuation-in-part of co-owned and U.S. patent application Ser. No. 08/794,783, filed Feb. 3, 1997, entitled CONTINUOUS PARTICLE SEPARATION OPERATION (now U.S. Pat. No. 5,830,282), which was a continuation-in-part of and co-owned application Ser. No. 08/445,530, filed May 23, 1995, entitled APPARATUS FOR CONTINUOUS FLAT-ROLLED STEEL STRIP CLEANSING AND FINISHING OPERATIONS (now U.S. Pat. No. 5,599,395).

INTRODUCTION

This invention relates to preparation of flat-rolled steel for finishing operations; and, more particularly, is concerned with surface cleansing of cold-reduced continuous-strip steel, in preparation for high-speed continuous annealing, prior to subsequent electrolytic plating.

OBJECTS OF THE INVENTION

Primary objects of the invention are to enable removal and permanent separation of surface contaminants from cold-reduced flat-rolled continuous-strip steel.

More specific objects are to provide continuous methods and apparatus for surface cleansing of cold-reduced flat-rolled strip steel by on-line regeneration of cleansing solution so as maintain substantially uniform cleansing solution without requiring periodic disposal of large volumes of contaminated cleansing solution.

Another object of the invention is to avoid any requirement for unscheduled interruption of continuous in-line operations due to cleansing solution conditions.

Other advantages and contributions of the invention are set forth in more detail in the following description with references to the accompanying drawings.

DETAILED DESCRIPTION OF THE INVENTION

Corrosion-protected flat-rolled mild steel constitutes a composite material of choice for significant engineering applications in the manufacture of machinery, building construction and product fabrication. Initially, continuously cast steel is hot-reduced to thickness gauges of about a quarter inch; then, referring to FIG. 1, heavy cold-reductions of hot-rolled thicknesses of about 0.025" to about 0.5" to a finish thickness of about 50 #/bb to about 100 #/bb are carried out for most electrolytic plating practice (referred to as Tin Mill practice). Such cold-reductions require large quantities of rolling lubricant solution; and generate large quantities of surface contaminants consisting essentially of iron fines, iron oxides and associated debris.

Figure 1:
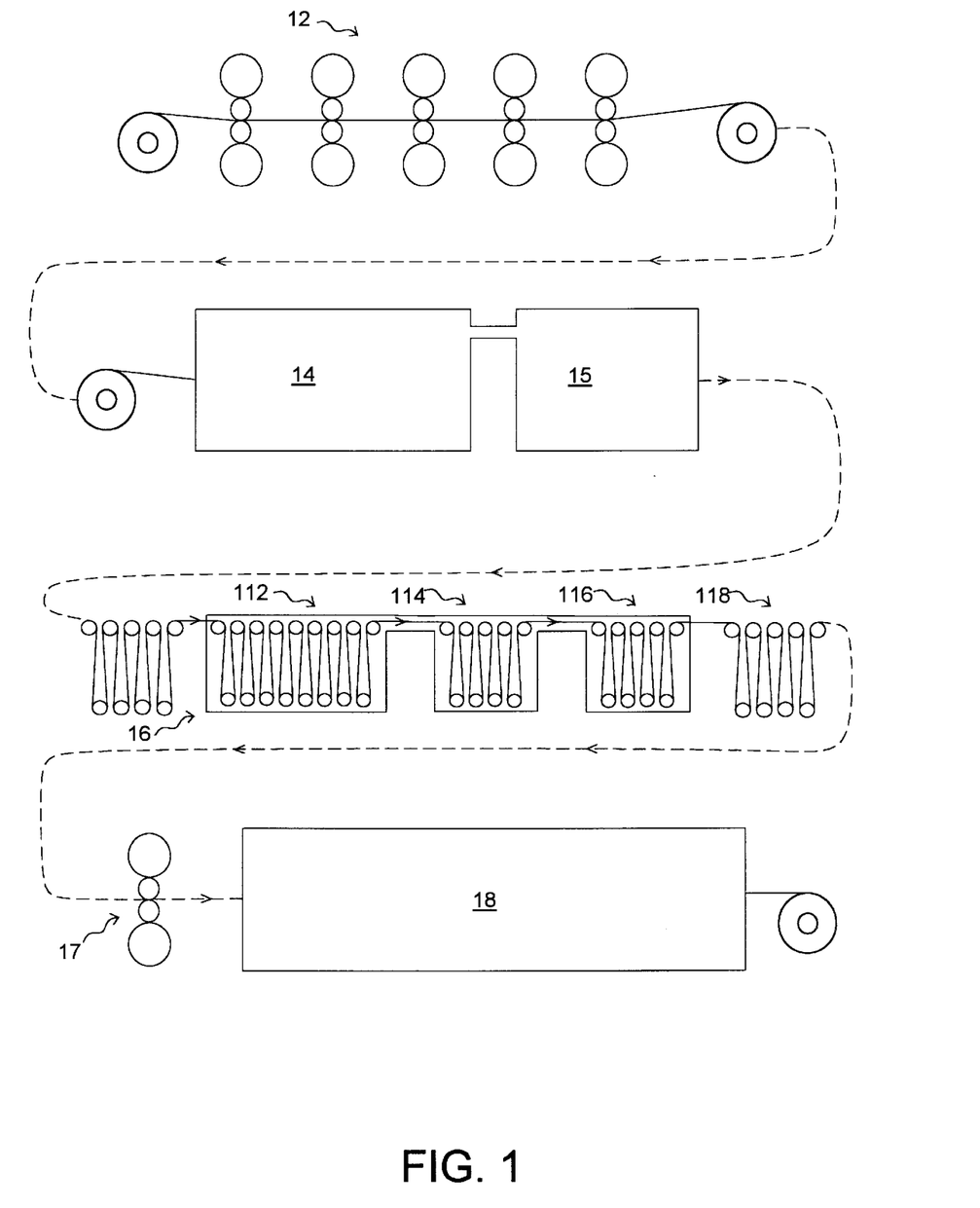
FIG. 1 is a general arrangement view for describing the combination of methods and apparatus of the invention in an integrated system for preparing continuous-strip steel for high line-speed continuous annealing and protective electrolytic metallic plating of the steel substrate.

Such surface contaminants build up during cold-reductions in a series of mill stands, such as shown in tandem mill 12 of FIG. 1. In the integrated system of FIG. 1, after reduction to finish thickness, station 14 and station 15, respectively, represent surface cleansing and rinsing operations from which the steel substrate is directed to heat treatment station 16. After levelling rolling mill 17, the strip steel surfaces are electroplated in metal plating line 18. Present practice emphasized herein controls the level of contaminants carried by the strip, after cleansing, so as to improve operations including finish-surface electrolytic metallic plating.

In steel mill practice, cold-reduced steel is generally coiled, as indicated in FIG. 1. The coiled strip, including cold-reducing surface contaminants, is then delivered to the Tin Mill for finishing. In the Tin Mill, processing steps including surface cleansing, heat treating of the steel substrate and electrolytic metallic plating are interrelated; surface cleansing steps at station 14 and rinsing at station 15 of FIG. 1 contribute to electrolytic finishing.

As recognized herein, numerous and repetitive roll passages at high temperatures (from about 1250° F. to 1500° F.) at stage 16, in order to anneal the steel substrate, fix the surface contaminants carried by the strip in place. Such surface contamination is damaging to the surfaces of the rolls, to the steel strip planar surfaces, and to the rolls of mill 17 (provided for returning temper to the steel and/or leveling of the strip) and can be detrimental to tinplating in plating line 18.

Cold-reducing steel strip produces surface contaminants comprising iron fines, iron oxide particulate, and associated debris as agglomerated by a lubricating cold-rolling solution. Prior practice concentrated on means for dislodging such contaminants from the planar surfaces of the strip. However, it is the strip itself which carries contaminants throughout the system; and, completely separating contaminants from the system has been found to have deficiencies.

A heated caustic alkali solution is used for surface cleansing of steel strip. Increasing contaminant level in that solution diminishes caustic alkali cleansing efficiency. Previously, significant operational time was utilized for periodic removal, by drainage discharge of major portions, such as fifty percent, of cleansing solution reservoirs. That method, as taught herein, can be detrimental to uniformity throughout the system.

Submerged travel in a heated alkali detergent solution, in large capacity tanks 22 and 24 (FIG. 2), provides chemical action for helping to dislodge rolling lubricants adhering to the strip, and to dislodge iron-bearing particulate. Mechanical scrubbing and/or other physical actions were emphasized to augment dislodging of surface contaminants.

Figure 2:
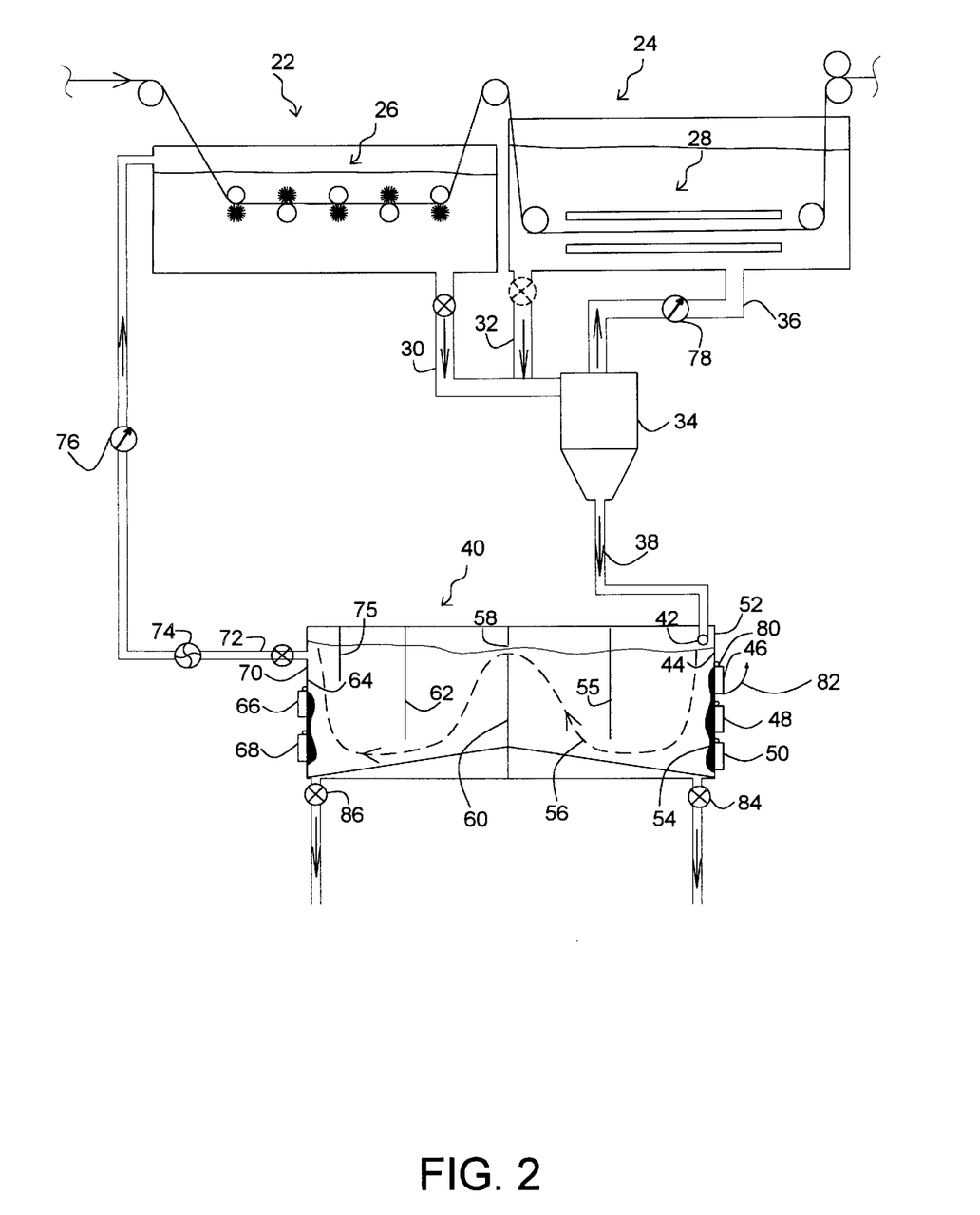
FIG. 2 is a more detailed schematic view for describing surface cleansing operational methods and apparatus of the invention.

Present teachings can enable diminishing emphasis on augmented dislodging of surface contaminants. For example, backup and scrubbing roll units 26 can be limited to tank 22; and, electrolytic action between electrodes, indicated generally at 28, is preferably limited to tank 24 for electrolytically dislodging contaminants not dislodged by such physical actions in tank 22. Also, the present invention concentrates on continuously and permanently separating surface contaminants entirely from the system.

Previously, in a typical Tin Mill, about eight to about twelve thousand gallons of contaminated alkali cleansing solution were dumped periodically and replaced while the line was inoperative. The interim between such periodic dumping of such large quantities of contaminated cleansing solution, and replacement was dependent on the condition of strip as received from the cold-reduction mill.

That large scale dumping practice is eliminated. The invention provides for continuously-operable incremental permanent separation of surface contaminants from the integrated system by an in-line regeneration system for cleansing solution. Selectively controlling rate of continuous removal and treatment of contaminated cleansing solution containing dislodged contaminants, consisting essentially of iron fines, iron oxide particulate and associated debris, is a first step in eliminating such periodic line interruptions for dumping large quantities of cleansing solution.

In the embodiment of FIG. 2, contaminated solution is withdrawn from tanks 22 and 24, at a controlled and limited gallons per minute rate, by means of conduits 30 and 32. Such contaminated fluid can be withdrawn by gravity at a controlled rate; but, such contaminated fluid is preferably pumped out at a controlled rate into continuous-flow filtering apparatus 34. Continuous-flow cyclone filtering apparatus is preferred. After filtering contaminants, apparatus 34 returns the filtrate to large-capacity tank 24 through conduit 36.

Continuous-flow cyclone filtering apparatus enables filtered contaminants to be continuously flushed from apparatus 34 using a flushing liquid such as contaminated cleansing solution. Such liquid-flushed contaminants are directed through conduit 38 toward separator structure 40 for permanently separating contaminants from the system. In the process, regenerated cleansing solution, at a desired purity level, is returned from separator structure 40 for surface cleansing usage.

The capacity of structure 40, that of tanks 22 and 24, and interrelated liquid flow rates therebetween are correlated for maintaining desired purity level of the cleansing solution.

Separator structure 40 includes support framing for paramagnetic sheet material which is substantially transparent to magnetic flux, such as polypropylene. One or more internal wall surfaces for the separator structure are designed, constructed and selected so as to present an accessible external surface which will support magnet means for establishing lines of magnetic flux which act internally of separator structure 40.

Flushed contaminants, directed through conduit 38, are spray-distributed by outlet 42 onto internal surface 44 of separator structure 40. Magnets 46, 48 and 50 are positioned along external surface 52 opposite such inlet wall of separator structure 40. Permanent magnet sources of magnetic energy have been selected for use in the strip cleansing embodiment being described. Electrically-operated means for generating magnetic flux can be selected but have certain operational disadvantages. Available magnetic strengths and long service-life make permanent magnets preferable.

The magnets are positioned to establish lines of magnetic flux internally of tank structure 40. Such magnetic flux magnetically attracts surface contaminants, comprising such ferromagnetic particulate and associated debris, internally of separator structure 40.

Magnetic flux is established internally of tank structure 40. Contaminated solution is distributed by outlet 42 along extended-area internal surface 44. Contaminants adhere, as indicated at 54; and, also, as liquid accumulates, extend horizontally into a contiguous compartment internally of separator structure 40.

Other locations for separating and retaining ferromagnetic particulate and associated debris are designed into the separator structure configuration utilizing such paramagnetic sheet material to establish a separator container structure. Each such location, as selected, presents an internal surface with opposite external surface which is accessible for disposing one or more sources of magnetic flux established internally of the separator container structure.

A dual-compartment separator structure is provided in FIG. 2. A flow path for removing contaminants from contaminated cleansing solution in the dual compartments is established by a series of internal paramagnetic sheet material baffles, a special-purpose sloping floor configuration, and a damsite intermediate the dual compartments for separation and retention of contaminants.

In separator structure 40, such baffles (also referred to as weirs) direct flushed contaminated cleansing solution to move downwardly along interior surface 44 for initiating substantially complete separation of contaminants. Magnetically held contaminants, as indicated at 54, also extend horizontally across the compartment in accumulating solution. Such suspended ferromagnetic contaminants are also magnetized by the magnetic flux so as to attract and retain ferromagnetic particulate and associated debris.

As magnetized contaminants are held, accumulating liquid flushing solution moves beneath first weir 55, as indicated by flow path 56 (shown as an interrupted line). The level of flushing liquid moves upwardly toward openings, such as 58, in damsite 60. Flow path 56 then extends downwardly around weir 62 from which flow path 56 is directed upwardly along internal surface 64, located contiguous to a portion of separator structure 40, for return of regenerated cleansing solution to tank 22, as indicated in FIG. 2.

And, iron fines, iron oxide particulate, and associated debris, which have not been separated and retained as a result of the magnetic flux established at the inlet portion of separator structure 40, follow such tortuous flow path 56 toward internal surface 64. Additional sources of magnetic flux along the flow path, such as magnets 66 and 68 which are positioned externally along surface 70, are located at a portion of separator structure 40 designed for return of regenerated cleansing solution.

Such additional sources for establishing lines of magnetic flux internally of an additional compartment of separator structure 40 augment regeneration of cleansing solution moving toward outlet conduit 72, by removing and retaining any contaminants remaining after passage from the first compartment of structure 40, which is largely under the influence of magnets 46, 48, 50.

Return of decontaminated cleansing solution is directed to in-line cleansing solution tank 22. Such return of regenerated cleansing solution can be carried out by pumping action at pump 74; or, can be returned by gravity feed, by a differing relative positioning of the separator structure than that shown in FIG. 2.

Barrier partitioning 75, within structure 40, circumscribes the opening to conduit 72 so as to help prevent oily froth from being returned to tank 22 as the regenerated cleansing solution accumulates in separator container structure 40.

Separation and retention of ferromagnetic particulate and associated debris in magnetic separator structure 40 are controlled by selection of flow rates, numbers of magnets, and magnet strength, so as to provide regenerated cleansing solution at an optimum purity level preselected for effective cleansing for a particular steel mill system and particular Tin Mill product. Measuring the purity level of cleansing solution is carried out by measuring iron fines; and, is expressed in parts per million (ppm). One such measurement is carried out at meter 76 along conduit 72 of FIG. 2.

A desired level of purity for desired cleansing can be selected, for example, in a range of about 250 ppm to about 750 ppm. Returning solution from separator structure 40, as measured at meter 76, is maintained equal to or less than the purity level measured at meter 78, for cyclone filtrate being returned by conduit 36. Flow-through in cyclone filtering apparatus is regulated and the operation of the filtering apparatus is controlled, as discussed further in relation to FIG. 3, to return filtrate of a desired purity level. Flow rates and tank capacities are correlated with separator structure 40.

Contaminants retained under the influence of magnetic flux, acting through each extended-area internal surface (44, 64) of separator structure 40, can be removed by vacuum suction along those surfaces. Or such accumulated iron fines, iron oxide particulate and associated debris, as separated, can be drained along with remaining flushing liquid from structure 40, directly for sewage disposal to water treatment facilities. Contaminants are thus completely and permanently separated from the entire integrated strip steel production system.

Removing such magnetically retained contaminants from separator structure 40 is facilitated by discontinuing establishment of lines of magnetic flux internally of separator structure. Electrically-operated magnets, if used, can be manually turned off. Permanent magnets have been pivotally mounted for drainage purposes. For example, each magnet 46, 48, 50, 66 and 68 is mounted as indicated by hinge structure 80 at source 46. Pivotally rotating such magnets ninety degrees (90°), as indicated by pivoting angle of rotation 82, establishes the lines of magnetic flux externally of structure 40, acting in a vertically-oriented direction. Such interruption of magnetic attraction internally of structure 40 releases accumulated contaminants, which descend readily under their own weight during drainage of remaining flush liquid, as valve 84 and (or) valve 86 are opened.

Discontinuing lines of magnet flux by selectively pivoting a magnet at a height-wise elevated position, such as magnet 46 and/or magnet 66, causes contaminants at that level to move downwardly, so as to be more concentrated at a lower level. Such a step can extend the time period available for complete and permanent separation of contaminants from structure 40. Also, such a step can help to more readily accommodate peaking contamination when loads are received on cold-reduced strip from tandem mill 12 (FIG. 1).

Also, compartments of structure 40 can be separately drained. Solution return wall surface 64 can advantageously be observed to provide a visual indication for draining the entry compartment for contaminated solution. That is, as contaminants begin to accrue along surface 64, it is an indication that contaminants being retained under the influence of magnets along surface 44 of such entrance compartment is being maximized. That is, surface contaminants are spilling over into the solution in the return compartment, through openings such as 58 in damsite 60.

In one method of the invention, initially, the internal influence of magnets at location 46, 48 and 50 should be interrupted; for example, by pivotal rotation to act vertically externally of separator structure 40. Drainage, of the entrance compartment can then be carried out independent of drainage from the return compartment. Later, the compartment for returning regenerated solution can also be drained independently. Such independent drainage of compartments decreases the quantity of concentrated contaminants sent with flushing liquid to a water treatment facility. In practice, the total volume of both compartments is selected to permit drainage of both at the same time.

Further structural details and operational features of a magnetically-assisted separator structure are available from copending and co-owned U.S. application Ser. No. 08/794, 783 (now U.S. Pat. No. 5,830,282) which is included herein by reference.

Figure 3:
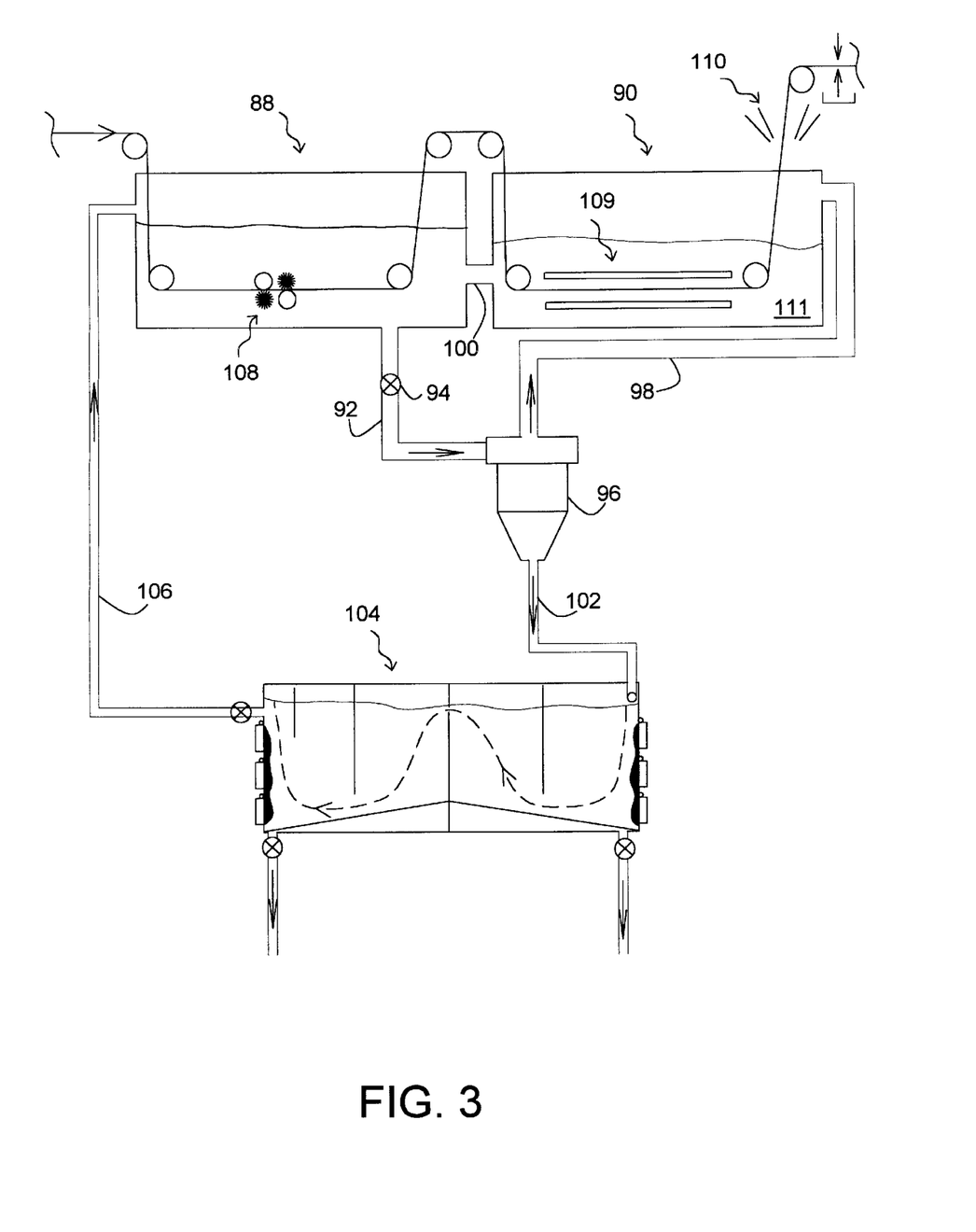
FIG. 3 is a schematic view of a specific embodiment for describing preferred surface cleansing apparatus and operations of the invention.

Increasing the availability of options and improving separation efficiency can be provided by the flow arrangements and orientation of structures shown and described in relation to the preferred embodiment of FIG. 3. The physical action for dislodging contaminants is concentrated in tank 88. Cleansing solution, with dislodged contaminants, is continuously withdrawn at a controlled rate from the first in-line submersion tank 88; however, filtrate is returned to tank 90.

Conduit 92 includes control valve 94 for control of solution removal from tank 88. The objective of that arrangement is to remove cleansing solution from a location at which dislodged contaminants are likely to be, or near be, their highest contamination level; while returning filtrate of desired purity level contiguous to the location at which strip is exiting from tank 90.

Contaminated solution from tank 88 is directed to cyclone filtering apparatus 96. Solid ferromagnetic particulate and associated semi-solid debris are removed from the contaminated solution by continuous centrifugal action; and, the filtrate is continuously directed through conduit 98 for return to tank 90.

The objective is to establish a counter-current flow of such cleansing solution in the large-capacity tanks; that is, opposite to strip travelling in the direction of its length. Such counter-current flow helps to minimize carry-out of contaminants by the strip exiting from tank 90. Also, such counter-current flow of cleansing solution through tank 90 facilitates dislodging of any remaining imbedded particulate by means of electrolytic action. In effect, such counter-current flow also enables initiation of a strip surface rinsing action in tank 90, carried out with significantly purified cleansing solution.

Counter-current flow from tank 90 into tank 88 takes place along path 100, which is selected to return cleansing solution at a location after the strip has received augmented scrubbing action in tank 88, and shortly before the strip travels into tank 90; that flow pattern also helps to minimize carry-over of contaminants from tank 88 into tank 90.

In the embodiment of FIG. 3, cleansing solution with high levels of dislodged contaminants is removed for filtering from tank 88; and, filtered solution of desired purity level, from continuous-flow cyclone apparatus 96, is returned to tank 90 at a location contiguous to exiting continuous-strip moving from tank 90.

Filtrate from cyclone apparatus 96, received in tank 90, moves with cleansing solution of that tank into tank 88. That counter-flow concept helps to minimize drag-out of contaminants from both tanks of the cleansing operation, and can contribute other operational advantages. Compartment 90 thus comprises the important location for measuring tank purity level, because that purity level is so significant in minimizing drag-out of contaminants to the remainder of the system. Also, that arrangement helps to minimize strip rinsing requirements upon leaving tank 90.

Also, with certain steel mill systems, augmenting dislodging of surface contaminants can be significantly diminished.

For example, each method for augmenting dislodging of surface contaminants can be confined to a single tank, such as brush and roll means 108 in tank 88 and electrolytic electrode means 109 in tank 90.

Continuously regenerating cleansing solution so as to maintain a desired purity level in tank 90, with the counter-current flow described, increases the opportunity for chemical action of the detergent in both tanks to provide a more uniform surface cleansing, with less physical or electrolytic augmentation being required for dislodging contaminants from strip surfaces and less contaminant drag-out.

Continuous steel strip traveling through large-capacity cleansing solution tanks (such as 22, 24 of FIG. 2) at a rate of about 400,000 to about 800,000 sq. ft. of surface per hour could, without the continuous filtering and regenerative teachings of the invention, cause the level of iron fines in such a pair of large-capacity tanks to rise to above one-thousand parts per million (1000 ppm) in about eight hours or less. In prior operating methods, during interruption of operations, a major portion of large-capacity cleansing solution reservoirs was dumped in order to at least partially restore purity level. At times, an average contaminant level of about 900 ppm had to be accepted for certain Tin Mill product in certain steel mills.

Such prior large-volume dumping practice causes difficulties due to required handling of large surges of contaminated cleansing solution at a mill's water treatment facilities. Also, an erratic rise and fall in purity level of on-line cleansing solution, resulting from such large quantity dumping practice, substantially precluded present objectives. A uniform purity level, particularly in the final tank 90 of FIG. 3, helps to avoid adverse effects throughout the system, including in the continuous anneal and in later electrolytic metallic plating.

With present concepts, contaminant level is maintained below a selected level. For example, a level in a range of up to about five hundred parts per million (500 ppm), on a continuing basis for a mill, is selected so as to provide more uniform cleansing during extended periods of operation, free of interruptions of line operations for any reason related to cleansing solution. And, prior large periodic surges of contaminated cleansing solution to a waste water treatment system are eliminated entirely.

Special measures undertaken to facilitate achieving those objectives are exemplified by the preferred embodiment of FIG. 3. The large-capacity tanks are interconnected with a primary function established for each. Substantially decreased drag-out and cleaner strip for subsequent processing are part of the contributions.

In addition to the improved purity level of tank 90, in order to diminish drag-out of cleansing solution adhering to each steel strip surface, the strip can be substantially vertically-oriented for exit from cleansing tank 90. A pneumatic wiping structure is shown schematically at 110 in FIG. 3, and wringer rolls can be combined with such pneumatic barrier apparatus. A demineralized water rinsing station can be utilized for both surfaces, upon exit from tank 90. Pneumatic wiping structure uses low-pressure high-volume air directed in a confined path extending across strip width, with directional control of the pneumatic discharge directing liquid toward, and over, each lateral edge, as disclosed in copending and co-owned U.S. application Ser. No. 08/864,222, entitled "Directional Removal Of Surface Liquid From Continuous Strip," filed May 28, 1997, which is included herein by reference.

In FIG. 3, filtrate from cyclone filtering apparatus 96 is returned to tank 90 so as to provide such earlier-described counter-current movement of cleaning liquid through cleansing tank 90 into tank 88. Filtrate being returned by conduit 98 also helps to complete a final rinsing-type action with a relatively non-contaminated cleaning solution, having a significantly lower contamination level than is otherwise available. The result is to significantly diminish the iron fines, iron oxide particulate and associated debris carried by the strip steel into the strip processing system.

The exit path for cleansed strip from solution 111 of tank 90 thus enables delivery of planar surfaces of the strip with significantly less drag-out of cleaning solution, and significantly decreases contaminant level at such exit below that previously selected as acceptable. Water rinsing of the strip, upon exit, can be significantly decreased. With selected combined wiping measures, and at lower line speeds, rinsing can be substantially eliminated.

Continuous-anneal heat treatment is carried out in a non-oxidizing or reducing atmosphere, in confined structures (as indicated at step 16 of FIG. 1), so as to maintain the surface cleanliness of the strip and prevent surface oxidation. Continuous annealing furnace section 112 establishes an annealing temperature for improving draw forming properties of the steel substrate; section 114 provides for holding that desired temperature within a protective atmosphere; and, cooling can be carried out in section 116 so as to terminate temperature-induced metallurgical changes; each phase helps to prevent surface oxidation.

Following heat treatment and cooling, the continuous-strip steel is directed to looping tower 118 for continued in-line processing, or to a bridle roll station, for recoiling (not shown).

Method and apparatus taught herein for continuous in-line regeneration of cleansing solution enable continuous operation of a continuous-strip cleansing and annealing system capable of achieving production, over extended periods of operation, of continuous-strip steel for finishing in electrolytic plating line 18 (FIG. 1), with the strip presenting substantially uniform surface conditions.

Dimensional measurements, capacity data, and flow rates for the preferred embodiment of FIG. 3, in correlated use in a system providing continuous annealing in preparation for continuous strip electrolytic plating, are tabulated in TABLE I.

TABLE I

| | |
|---|---|
| Tank (88) and Tank (90) Total Capacity | 17,000 Gals. |
| Source of Caustic Detergent Materials | Elf Atochem North America, Inc. |
| | 2375 State Road |
| | Cornwall Heights, PA 19020 |
| Cleansing Solution Temperature | About 160° F. to about 180° F. |
| Withdrawal Rate by Continuous-Flow Filter Apparatus 96 from Tank 88, Selected in a Range of | 100–250 Gals./Min. |
| Source of Centrifugal Cyclone Apparatus (96) | Lakos Centrifugal Separators USA |
| | 1911 N. Helm Ave. |
| | Fresno, CA 93727 |
| Concentrated Contaminant Flushed From Apparatus 96 and Directed to Separator Structure 104, Selected in a Range of | 2.5–15 Gals./Min. |
| Separator Structure 104, Total Capacity Both Compartments | 500 Gals. |
| Magnetic Field Strength | 1400 Gauss/magnet |
| Source of Permanent Magnets | Eriez, Inc. |
| | Erie, PA 16512 |
| Magnets at Entrance Surface 44 | 3 |

TABLE I-continued

| | |
|---|---|
| Magnets at Exit Surface 64 | 3 |
| Dimensions of Each Magnet | 48" × 12" × 1" |
| Steel Strip Throughput for Continuous Cleansing and Annealing Line | About 400,000 sq. ft. to about 800,000 sq. ft. of surface per hr. |
| Acceptable Purity to be Maintained, Selected in a Range of About | 250–750 ppm |

Electrolytic plating, such as tinplating, in a continuous-processing line can be carried out independently of such continuous cleansing and annealing line; but, such electrolytic plating is carried out to take advantage of the cleansed surfaces provided.

Tin Mill practice includes electrolytic tin, zinc or nickel/zinc plating, electrolytic metallic plating combining chrome and chrome oxide (TFS) or other acceptable coating for corrosion protection of low carbon steel, which benefits from the in-line regenerative cleansing solution teachings of the invention. Tin Mill product can include single-reduced steel or double-reduced steel without an intermediate anneal.

While specific materials, dimensional values, magnet strengths, flow-control apparatus and operating methods have been set forth for purposes of describing the invention, it should be noted that, in the light of the above teachings, other materials, apparatus and method steps can be selected without departing from basic concepts disclosed herein which form part of the invention. Therefore, for purposes of determining the scope of patentable subject matter, reference shall be had to the appended claims.

What is claimed is:

1. Processing flat-rolled continuous-strip steel, in preparation for in-line electrolytic metallic plating finishing operations, so as to eliminate interruption of in-line operations for cleansing solution purposes, comprising (A) providing for submersed travel of continuous-strip steel, through extended-length cleansing solution holding means, for dislodging surface contaminants which consist essentially of iron fines, iron oxide particulate and associated debris, while such strip is moving in the direction of its length at a line speed commensurate with subsequent in-line processing requirements;

(B) selecting a purity level range for such surface cleansing solution for sustaining desired surface cleansing for subsequent in-line processing;

(C) continuously regenerating such cleansing solution, during such continuous in-line operations, to establish a purity level within such selected range, by substantially continuously:
  (i) controllably withdrawing cleansing solution, with dislodged contaminants, from such holding means at a predetermined rate,
  (ii) directing such withdrawn cleansing solution to continuous-flow filtering means, for physically filtering dislodged contaminants so as to obtain a return-filtrate which is within such selected purity-level range,
  (iii) returning such filtrate to such holding means for continuing use in dislodging such surface contaminants from such submerged continuous-strip, while (D) providing magnetically-assisted contaminant separator structure including support framing for paramagnetic sheet material, with such sheet material:
  (i) defining separator-container means having significantly less capacity, for holding liquids than such extended-length cleansing-solution holding means, such separator-container means, including
  (ii) at least one extended-surface-area wall means presenting an internal surface of such separator structure and an accessible external surface, supported by such framing;

(E) positioning permanent magnet means, for establishing lines of magnetic flux acting internally of such separator structure, so as to attract and retain iron fines, iron oxide particulate and associated debris internally of such separator container means, by
  supporting such magnet means contiguous to such external wall surface so as to establish lines of magnetic flux acting internally of such separator-container means;

(F) providing a flushing liquid, selected from the group consisting of (i) contaminated cleansing solution, and (ii) an aqueous liquid compatible with such cleansing solution, for continuously flushing physically-filtered contaminants from such continuous-flow filtering means, and (G) directing such flushing liquid and flushed contaminants for distribution over such extended internal surface area, of such paramagnetic sheet material wall means, for attraction and retention of such contaminants by such lines of magnetic flux acting internally of such separator container means, while (H) returning decontaminated flushing liquid, which has been subjected to such magnetic flux for separating and retaining contaminants, is returned to such in-line holding means so as to maintain a purity level within such selected range for such surface cleansing solution.

2. The process of claim 1, further including
maintaining such continuous-flow filtering of such cleansing solution with dislodged contaminants while periodically, and temporarily discontinuing establishment of such lines of magnetic flux internally of such separator structure so as to release such magnetically separated and accumulated retained contaminants, and
discharging such accumulated contaminants and flushing liquid from such separator container means, so as to provide for permanent and complete disposal of such accumulated contaminants independently of such in-line continuous-strip steel processing.

3. The process of claim 2, including
presenting a plurality of such contaminant-separating walls in spaced relationship forming such separator container means, each such contaminant separating wall having an internal surface and an accessible external surface for positioning magnet means to establish lines of magnetic flux acting internally of such container means so as to provide for magnetically-assisted contaminant separation and retention by magnet means positioned contiguous to the external surface of each respective contaminant-separating wall, and
directing flow of flushing liquid with dislodged contaminants, within such contaminant-separator means, so as to be magnetically attract and retain contaminants at a plurality of such spaced internal wall surfaces, of such separator structure, by such externally-mounted permanent magnet means of such respective spaced wall surfaces.

4. The process of claim 3, in which
provision is made for continuing such continuous-flow filtering and permanently separating contaminants in such separator structure, during interruption of operations for scheduled line maintenance procedures, so as to decrease contaminant level in such cleansing-solution holding means while solution in such holding means is free of added contaminants during such interruption of operations for maintenance procedures.

5. The process of claim 3, including selectively terminating lines of magnetic flux acting internally of a wall means of such separator structure by selection from the group consisting of (i) an individual magnet means on such wall means, and (ii) plural magnet means along such wall means, by pivotally mounting such permanent magnets contiguous to external wall surface means, so as to (a) enable establishing, as contiguously mounted, such lines of magnetic flux internally of such separator structure, and, so as to (b) enable terminating such lines of magnetic flux acting internally of such separator structure, by rotatably moving selected magnet means so as to establish such lines of magnetic flux externally of such contaminant separator structure.

6. The process of claim 3, including (i) providing for submerged travel of surface-contaminated strip through a pair of elongated large-capacity tanks, (ii) carrying out surface cleansing by selectively establishing a large-capacity strip-entry tank, and a remaining large-capacity strip-exit tank for sequential strip exit of such strip steel moving in the direction of its length, (iii) establishing interconnecting flow communication for movement of cleansing solution between such large-capacity tanks, (iv) selectively removing contaminated solution from such strip-entry tank and directing to such continuous-flow filtering means, (v) processing such contaminated cleansing solution through such continuous-flow filtering means; and (vi) returning filtrate to such strip exit tank so as to cause movement of cleansing solution from such strip-exit tank toward such strip-entry tank in counterflow relationship to strip travel, in the direction of its length, through such tanks.

7. The process of claim 6, further including measuring contaminant level in such strip exit tank, and selectively controlling contaminant level in such strip exit tank, by quantitatively controlling withdrawal rate of contaminated solution from such strip-exit tank, and quantitatively controlling delivery of flushed contaminants to such magnetically-assisted separator structure, and controlling rate of permanent separation of contaminants and rate of return of regenerated cleansing solution to such strip exit tank for continuing usage.

8. The process of claim 6, in which such cleansing solution comprises a caustic alkali detergent cleansing solution, further including (a) maintaining such alkali cleansing solution at a temperature within a selected range above ambient temperature, (b) supplying alkali cleansing solution to replace losses due to evaporation and in-line operational strip travel losses, while (c) avoiding a requirement for interruption of operations for dumping of large quantities of such cleansing solution, by (d) directing returning filtrate from such continuous-flow filtering means to a location contiguous to exit of such continuous-strip steel from such strip-exit tank, and (e) selectively (i) directing such make-up cleansing solution, and (ii) returning regenerated cleansing solution from such contaminant-separator structure, by selection from the group to such in-line strip-entry tank, and to such in-line strip exit tank.

9. The process of claim 6, further including augmenting chemical detergent-action dislodging of surface contaminants from planar surfaces of such continuous-strip steel, by selecting from the group consisting of:

(a) using physical force for scrubbing planar surfaces of such continuous-strip steel, (b) electrolytically dislodging contaminants from such continuous-strip surfaces, and (c) combinations of (a) and (b).

10. The process of claim 9, including selectively carrying out such physical force scrubbing in such strip-entry tank, and selectively carrying out such electrolytic dislodging of contaminants in such strip exit tank.

11. A continuously-operable system for maintaining a selected purity level range for cleansing solution for in-line dislodging of strip steel surface contaminants, consisting essentially of iron fines, iron oxide particulate and associated debris, in-line processing and finishing, comprising (A) means for controllably feeding elongated continuous-strip steel, having contaminated substantially-planar surfaces, at a line speed correlated with in-line processing operations;

(B) a continuously-operable strip surface cleansing system, including:

(i) large-capacity in-line cleansing solution holding means, for submersed travel, in the direction of its length, for dislodging such iron fines, iron oxide particulate and associated debris from such surfaces of such continuous-strip;

(ii) means for continuously withdrawing, at a controlled rate, a selected portion of contaminated cleansing solution from such large-capacity cleansing solution holding means;

(iii) continuous-flow filtering means for continuously receiving and continuously physically filtering such a preselected minimum portion of such contaminants;

(iv) means for continuously returning filtrate, from which such contaminates have been physically filtered, so as to maintain a selected purity level for contaminants in such large-capacity holding means;

(v) means for directing an aqueous flushing liquid, selected from the group consisting of contaminated cleansing solution and a liquid compatible with such cleansing solution, for continuously flushing accumulating contaminants, as filtered, from such continuous-flow filtering means for magnetically-assisted separating and retaining of iron fines, iron oxide particulate and associated debris from such aqueous flushing liquid;

(vi) separator tank structure with framing supporting paramagnetic sheet material presenting extended-area peripheral wall means which are accessible from internally and externally of such separator tank structure, so as present
  (a) an internal wall surface of such paramagnetic sheet material for receiving such continuous aqueous flushing liquid with dislodged contaminants, and
  (b) an external wall surface opposite such internal surface;
(vii) means for disposing permanent magnets in contiguous relationship with such exterior wall surface for establishing lines of magnetic flux acting internally of such separator tank structure, so as to magnetically attract iron fines, iron oxide particulate and associated debris, which contaminants suspended in such flushing liquid, in substantially-fixed relationship to such interior wall surface, within such separator tank structure; and
(viii) means for directing flushing liquid as received through such magnetically-assisted separator tank structure as to continuously separate and retain such contaminants during exposure to such lines of magnetic flux while moving toward a location for return of regenerated cleansing solution to such large capacity in-line cleansing solution holding means.

12. The system of claim 11, in which
such means for directing contaminated flushing liquid through such separator tank structure includes:
  (A) paramagnetic damsite means dividing such separator tank structure into a plurality of interior compartments having a total capacity which is about 2.5% of the capacity of such in-line cleansing solution holding means, and
  (B) weir baffle means, disposed internally of such separator structure for directing flow-movement of such flushing-liquid in a tortuous path within and between such interior compartments and contiguous to plural selected internal wall surfaces of such separator structure so as to augment magnetic separation and retention of contaminants contiguous to such selected internal wall surfaces.

13. The system of claim 12, in which
such means for disposing such permanent magnets, includes
  (i) means for enabling selective rotational positioning of such magnets individually, and in groups, so as to
enable terminating action of such lines of flux internally of such tank structure so as to provide for permanent removal of such contaminants from such separator tank means, and from such processing line, independently of, and free of interruption of, such in-line strip-steel surface-cleansing operations.

* * * * *